United States Patent Office 3,228,772
Patented Jan. 11, 1966

3,228,772
EMULSIFICATION AGENTS
Bruce D. Buddemeyer, Overland Park, Kans., John R. Moneymaker, Kansas City, Mo., and Maurice C. Meyer, Kansas City, Kans., assignors to The Paniplus Company, Kansas City, Mo., a corporation of Missouri
No Drawing. Filed Mar. 1, 1963, Ser. No. 262,251
The portion of the term of the patent subsequent to July 14, 1981, has been disclaimed
30 Claims. (Cl. 99—94)

This invention is a continuation-in-part of co-pending application Serial No. 162,927, filed December 28, 1961, now U.S. Patent No. 3,141,030, and a continuation-in-part of co-pending application Serial No. 162,946, filed December 28, 1961.

This invention is concerned with improved emulsification agents which are especially useful in food products, cosmetics and pharmaceutical preparations.

The addition agents of the present invention are of a lipoidal nature and when added as ingredients in, for instance, bakery products, considerably improve their physical properties resulting in enhanced consumer appeal. The addition agents may be employed as separate ingredients, or may be admixed with other ingredients of the formulae and in this form incorporated into the formulation from which the products are made.

An object of the present invention is to provide new and improved agents of a lipoidal character, which, when added as ingredients to baked leavened dough products, considerably improve the properties of such products.

Another object of the present invention is the provision of shortening compositions containing such addition agents.

Another object of the present invention is to provide new and improved agents which, when included as ingredients in icings, fillings, fondants, creams and the like, considerably improve their properties and usefulness.

Other objects of the present invention will in part be obvious and will in part be made clear from the following description.

The agents of the present invention comprise, in combination: (1) acyl lactylic acids, including salts thereof; and (2) certain polyol esters of fatty acids.

The polyol esters of fatty acids may be characterized as mono- and/or di-fatty acid esters of aliphatic polyhydric alcohols or derivatives thereof.

The acyl lactylic acids and their corresponding salts forming part of the addition agents disclosed herein correspond to the formula

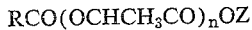

RCO(OCHCH₃CO)ₙOZ wherein RCO is a member selected from the group consisting of acyl radicals of fatty acids containing 16 to 24 carbon atoms, and mixtures thereof, Z is a cation and $n$ is a number which represents the average number of lactyl, i.e. (OCHCH₃CO), groups present per molecule. The value of $n$ may vary from about 0.1 to 10.0 and is preferably between about 0.3 and 6.0. Best results are achieved with acyl lactylic acid compositions having a value for $n$ of less than 1, or between about 0.3 and 0.9, and such materials are preferred for use.

The cation Z in the above formula may be selected from the group consisting of hydrogen, when the material is in the acid form, and alkali metals, alkaline earth metals, ammonia and aluminum, when the material is in the salt form. Among the preferred alkali metal cations may be mentioned sodium and potassium. The preferred alkaline earth metals include calcium and magnesium.

The acyl lactylates are prepared by reaction of fatty acids of the type described or derivatives thereof and lactic acid or its derivatives.

The method of making acyl lactylic acid compounds with $n$ values greater than 1 is well understood in the art, suitable methods being disclosed, for example, in United States Patent Nos. 2,793,270 and 2,733,252.

The acyl lactylic acid compositions with $n$ values less than 1 are recent in origin, and they, together with their method of preparation, are disclosed in our co-pending application, Serial No. 162,927, filed December 28, 1961, now U.S. Patent 3,141,030 of which this application is a continuation-in-part.

The mono- and/or di-fatty acid esters of aliphatic polyhydric alcohols, or derivatives thereof, forming part of the addition agents disclosed herein may be characterized, in whole or in part, as the reaction products of fatty acyl compounds containing 16 to 24 carbon atoms, or mixtures thereof, with aliphatic polyhydric alcohols or derivatives thereof, containing at least 2 or between about 2 and 10 hydroxyl groups in the aliphatic chain. Preferably the number of carbon atoms in the aliphatic chain of the polyhydric alcohols is fewer than about 12.

As examples of the polyhydric alcohols may be mentioned the dihydric alcohols, such as ethylene glycol, propylene glycol, butylene glycol, and the like; the trihydric alcohols, such as glycerol; and the higher aliphatic polyhydric alcohols, such as sorbitol.

As examples of the mono- and di-fatty acid esters of aliphatic polyhydric alcohols forming part of the addition agents disclosed herein, and preferred for use, may be mentioned the mono-fatty acid esters of glycerol, more commonly referred to as mono-glycerides, including compositions comprising mixtures of mono- and di-glycerides; propylene glycol monostearate; glyceryl lactopalmitate; glyceryl lactostearate; sorbitan monostearate; and polyoxyethylene ($n$) sorbitan monostearate; including mixtures of the foregoing.

The mono-glycerides, or mixtures of mono- and diglycerides are prepared by procedures which are now well known, as for example, by careful alcoholysis of naturally occurring fats with glycerol.

Sorbitan monostearate is a mixed partial stearic ester of sorbitol anhydride. Polyoxyethylene ($n$) sorbitan monostearate is a complex mixture of polyoxyethylene ethers of mixed partial stearic esters of sorbitol anhydride. The ($n$) refers to the average number of polyoxyethylene groups present per mole of the composition, and may range from 1 to 100 or more, although usually it will range between about 10 and 30. Particularly suitable for use is polyoxyethylene (20) sorbitan monostearate, which contains about 20 polyoxyethylene groups per mole of the composition.

Propylene glycol monostearate may be made by the reaction of propylene glycol and stearic acid.

Glyceryl lactopalmitate is the name given to the product obtained by the reaction of glycerol, higher fatty acids comprising at least about 50 percent by weight palmitic acid, and lactic acid. The method of making glyceryl lactopalmitate is well known, and a particularly advantageous method is described in United States Patent No. 2,690,971.

Glyceryl lactostearate is a product obtained by a similar reaction as stated above with the exception that stearic acid is substituted for palmitic acid.

As described in the referred to patent, glyceryl lactopalmitate may be prepared by reacting glycerol with about 1 equivalent mol per mol of glycerol of a mixture of myristic, palmitic and stearic acids containing at least 50 percent by weight palmitic acid, and between about 0.5 and 1 mol of lactic acid per mol of glycerol.

In carrying out the reaction, the mixed fatty acids, glycerol and latic acid are heated to a temperature of about 185° C., in a vacuum with removal of water formed by the reaction; refluxing of lactic acid; and sparging with an inert gas, such as $CO_2$; and maintained at such conditions until the acid number of the reaction product is below about 8.1. The reaction product is then washed with water until substantially free of water-soluble material. The water washed reaction product comprises about 40–50 percent of mixed lactic acid-fatty acid diglycerides; about 16–25 percent monoglycerides; and the balance substantially all diglycerides of the fatty acids. The amount of triglycerides in the reaction product is quite low, and is usually less than about 1 percent.

The following are typical formulae for the addition agents disclosed herein.

EXAMPLE 1

| Ingredients: | Weight percent |
|---|---|
| Acyl lactylates | 10 to 90 |
| Monoglycerides of fatty acids | 90 to 10 |

EXAMPLE 2

| Ingredients: | Weight percent |
|---|---|
| Acyl lactylates | 10 to 90 |
| Mixture of mono- and di-glycerides of fatty acids | 90 to 10 |

EXAMPLE 3

| Ingredients: | Weight percent |
|---|---|
| Acyl lactylates | |
| Mixture of the following— | |
| 5 to 20 wt. percent polyoxyethylene (20) sorbitan monostearate | 1 to 99 |
| 80 to 95 wt. percent sorbitan monostearate | 99 to 1 |

EXAMPLE 4

| Ingredients: | Weight percent |
|---|---|
| Acyl lactylates | 10 to 90 |
| Propylene glycol monostearate | 90 to 10 |

EXAMPLE 5

| Ingredients: | Weight percent |
|---|---|
| Acyl lactylates | 10 to 90 |
| Glyceryl lactopalmitate | 90 to 10 |

In the addition agents, the weight ratio of the mono- and/or di-ester to the acyl lactylate may vary from about 0.01 to 100, and is usually between about 0.1 and 100. Preferably, and for best results, this weight ratio is between about 0.33 and 10.

As already described, the addition agents disclosed herein may be added as an ingredient to bakery goods either separately, or admixed with conventional ingredients.

Preferably, the addition agents are mixed with the shortening or water, and in this way introduced into the formulae for making the baked goods.

Regardless of whether the addition agents are incorporated as such or in admixture with other ingredients, the amount of the addition agent added to the bakery products may comprise between about 0.1 and 30 percent by weight, based upon the shortening weight, and is preferably between about 0.3 and 10 percent, based upon the shortening weight.

Shortenings with which the addition agents of the present invention may be combined are of the usual type, and in general are triglyceride oils or fats derived from animal sources such as lard or tallow and from plant sources such as the seed oils of corn, cotton, soy and the like. It is normal practice for those shortenings to be refined and processed to improve their properties. The usual treatments include catalytic hydrogenation to improve the plasticity, increase hardness and reduce the iodine number of the fatty material, and heat treatment in the presence of alkaline catalysts, with or without added glycerine, to improve the physical properties and functionality. For instance, the plastic super-glycerinated vegetable shortenings have been hydrogenated and subjected to inter-esterification reactions to improve the physical characteristics and increase the content of mono- and diglycerides and to increase the emulsification properties of the shortening. Shortenings of the usual type may also contain glycerine and/or natural or hydroxylated lecithin.

When the addition agents are to be combined with shortening and/or oil, this may be done by dissolving the agents in the usual type shortening, and then stirring and tempering the resulting mixture. Final treatment may also include the chilling and whipping treatments of the Votator process in the case of plastic shortenings.

As indicated above, the amount of the addition agent in the baked leavened dough products may comprise between about 0.1 and 30 percent, based upon the weight of the shortening. Shortening compositions containing the desired amount of addition agent may be prepared and added in lieu of the usual shortening. Obviously, however, mixtures of the usual shortenings and larger amounts of the addition agent can be produced, and this admixture can be used in lieu of only a portion of the usual shortening with the same net benefits resulting, and such compositions are to be considered part of this invention. Thus, shortenings containing anywhere from 0.1 to 99 weight percent or more of the addition agents disclosed herein are within the purview of the instant invention.

The ingredients employed in making baked leavened products form no part of the present invention since any suitable formula may be used. The basic ingredients used in the manufacture of bread, for example, are flour, water, sodium chloride and yeast. For commercial bread, sugar, milk and shortening are conventionally added to these basic ingredients. For cake, or other sweet leavened products, eggs as well as other enriching agents may be added. Ordinarily, in making cake, chemical leavening agents, such as baking powder, rather than yeast, are employed.

The addition agents disclosed herein are especially suitable for use in cake formulae, and when added to such formulae provide for improved batter aeration and stability, symmetry and grain characteristics. The cakes obtained by using these addition agents are desirably tender or "short" and have superior eating and keeping qualities. In addition, the use of the addition agents disclosed herein makes it much easier to prepare a satisfactorily balanced formula for a high ratio prepared dry cake mix. By a high ratio prepared dry cake mix is meant one with a high ratio of sugar to flour. The sweeter or higher this ratio (over 1:1) in cakes, the better will be the properties and keeping qualities of the confection.

The cake mixes according to the invention can be prepared, for example, by thoroughly blending together the usual mix ingredients, such as flour, baking powder and sugar, with the addition agents disclosed herein. Preferably, the addition agents are added to the shortening, or to water to form a water dispersion, and in either of these forms are blended with the dry ingredients of such a mix before addition of the ordinary liquid ingredients, such as water, milk, eggs, flavorings and the like.

The following examples will serve to illustrate the preparation of cake incorporating the addition agents disclosed herein.

To demonstrate in part the effect of the additives of the present invention, the mono- and/or di-fatty acid esters of aliphatic polyhydric alcohols or derivatives thereof, forming one part of the two part addition agents disclosed herein, were bake tested to establish optimum functionality of such materials alone in a typical commercial white cake formula and procedure. For comparison, representative two part additives disclosed herein were tested using identical procedures.

EXAMPLE 6

Two parts by weight commercial vegetable shortening comprising essentially triglycerides were melted with one part of a commercially distilled glyceryl monostearate, which will be referred to as the one-part emulsifier. The homogeneous molten mixture was whipped with a small propellant type mixer and rapidly chilled until a soft plastic mixture was obtained.

This preparation was compared in baking tests with a representative mixture of the two part additives disclosed herein and composed of two parts by weight shortening and one-half part of distilled glyceryl monostearate and one-half part of a stearyl lactylic acid which contained an average of 0.9 lactyl group per molecule. This physically similar material will be referred to as the combination emulsifier.

The following recipe and procedure were employed to establish the effects of various levels of distilled monoglycerides:

| Ingredients | Bakers, percent | Gms. |
|---|---|---|
| Cake flour | 100 | 363.1 |
| Granulated salt | 3 | 10.9 |
| Baking powder | 6 | 21.8 |
| Sugar | 120 | 435.7 |
| Powdered milk | 10 | 36.3 |
| Dry vanilla concentrate | 0.4 | 1.5 |
| Shortening | 36 | 130.7 |
| Water | 90 | 327.0 |
| Frozen egg whites | 70 | 254.2 |

The emulsifier was included as a partial substitute for shortening, so that the total base oil and emulsifier equaled 36 percent based on the flour weight.

Shortening and emulsifier were added to the total dry mix (869.3 gms.), cut in, and mixed for four minutes on first speed (slow) using a Hobart C-100 mixer equipped with a three quart bowl and batter paddle.

*First stage*

Over a one-minute period 225 mls. of water was added while mixing at first speed, the bowl was scraped and mixing continued at first speed two minutes.

*Second stage*

All of the eggs were added over a one-minute period at first speed, the bowl scraped down, and mixing continued two and one-half minutes at second speed.

*Third stage*

Over a one-minute period 102 mls. of water was added while mixing at first speed, the bowl scraped down, and mixing continued three minutes at first speed.

The temperature of the water and eggs was controlled so that batter temperature was controlled between 72° F. and 75° F.

368 gms. of batter was scaled into two 8 inch diameter by 1½ inch cake pans and baked at 375° F. for twenty-four minutes. Cakes were allowed to cool for forty-five minutes prior to measuring volume by rape seed displacement and cut for quality comparisons.

Cake quality was evaluated with the system used by the American Institute of Baking and is a summary of the following factors.

Factor: Maximum quality score
- Symmetry _____ 4
- Bake [1] _____ 8
- Volume _____ 8
- Color of crumb _____ 5
- Grain _____ 5
- Texture _____ 10
- Flavor and aroma _____ 12
- Eating quality _____ 8
- Icing and filling _____ 40

Total possible score _____ 100

[1] The term bake refers to the overall general external appearance of the un-iced cake.

In these evaluations, the factor of icing and filling was held constant at full value.

The experimental data recorded included the following information.

| Use Level (Based on Total Flour) | Emulsifier | Batter Specific Gravity | Cake Volume (cc.) | Cake Specific Volume | Cake— Total Quality Score |
|---|---|---|---|---|---|
| 0 | | 0.925 | 780 | 2.35 | 74.0 |
| 1% | One part a | 0.949 | 820 | 2.5 | 80.0 |
| 2% | do | 1.060 | 910 | 2.8 | 83.0 |
| 3% | do | 0.701 | 870 | 2.7 | 77.5 |
| 1% | Two part b | 0.852 | 880 | 2.6 | 83.0 |
| 2% | do | 0.740 | 1,080 | 3.3 | 92.0 |
| 3% | do | 0.707 | 1,070 | 3.2 | 84.5 | a Glyceryl monostearate.
b Mixture of 50% glyceryl monostearate and 50% stearyl lactylic acid containing 0.9 lactyl groups per molecule.

EXAMPLE 7

Using the same method as described in Example 6 a mono- and diglyceride preparation which contained 40% monoglyceride and 50% diglyceride was tested.

The pertinent data was as follows:

| Use Level (Based on Total Flour) | Emulsifier | Batter Specific Gravity | Cake Volume (cc.) | Cake Specific Volume | Cake— Total Quality Score |
|---|---|---|---|---|---|
| 0 | | 0.925 | 780 | 2.35 | 74.0 |
| 1% | One part c | 0.886 | 840 | 2.5 | 79.5 |
| 2% | do | 0.909 | 880 | 2.7 | 83.0 |
| 3% | do | 0.942 | 880 | 2.7 | 78.5 |
| 1% | Two part d | 0.854 | 790 | 2.4 | 82.0 |
| 2% | do | 0.791 | 1,010 | 3.1 | 88.5 |
| 3% | do | 0.736 | 1,080 | 3.2 | 84.5 | c Glyceride containing 40% monglyceride and 50% diglyceride.
d Mixture of 50% "c" and 50% stearyl lactylic acid containing 0.9 lactyl groups per molecule.

EXAMPLE 8

With the method outlined in Example 6, a propylene glycol monostearate preparation was evaluated.

The pertinent data was as follows:

| Use Level (Based on Total Flour) | Emulsifier | Batter Specific Gravity | Cake Volume (cc.) | Cake Specific Volume | Cake— Total Quality Score |
|---|---|---|---|---|---|
| 0 | | 0.925 | 780 | 2.35 | 74.0 |
| 1% | One part e | 0.892 | 760 | 2.3 | 75.5 |
| 2% | do | 0.813 | 890 | 2.7 | 78.5 |
| 3% | do | 0.743 | 800 | 2.5 | 78.0 |
| 1% | Two part f | 0.884 | 770 | 2.3 | 82.5 |
| 2% | do | 0.837 | 970 | 3.0 | 85.5 |
| 3% | do | 0.989 | 1,000 | 3.0 | 85.0 | e Propylene glycol monostearate.
f Mixture of 50% "e" and 50% stearyl lactylic acid containing 0.9 lactyl groups per molecule.

EXAMPLE 9

The testing method outlined in Example 6 was employed using a commercial glyceryl lactopalmitate preparation.

The pertinent data was as follows:

| Use Level (Based on Total Flour) | Emulsifier | Batter Specific Gravity | Cake Volume (cc.) | Cake Specific Volume | Cake— Total Quality Score |
|---|---|---|---|---|---|
| 0 | | 0.925 | 780 | 2.35 | 74.0 |
| 1% | One part g | 0.874 | 810 | 2.4 | 73.0 |
| 2% | do | 0.884 | 1,000 | 3.0 | 85.0 |
| 2.5% | do | 0.870 | 995 | 3.10 | 84.5 |
| 3% | do | 0.870 | 900 | 2.7 | 82.5 |
| 1% | Two part h | 0.880 | 790 | 2.4 | 81.5 |
| 2% | do | 0.839 | 990 | 3.0 | 86.0 |
| 3% | do | 0.787 | 1,080 | 3.2 | 84.5 | g Glyceryl lactopalmitate.
h Mixture of 50% "g" and 50% stearyl lactylic acid containing 0.9 lactyl groups per molecule.

EXAMPLE 10

Example 6 was repeated, with the exception that a commercial preparation of the compound glyceryl lactostearate was evaluated.

The pertinent data was as follows:

| Use Level (Based on Total Flour) | Emulsifier | Batter Specific Gravity | Cake Volume (cc.) | Cake Specific Volume | Cake—Total Quality Score |
|---|---|---|---|---|---|
| 0 | | 0.925 | 780 | 2.35 | 74.0 |
| 1% | One part i | 0.904 | 820 | 2.5 | 71.0 |
| 2% | do | 0.870 | 910 | 2.8 | 82.0 |
| 2.5% | do | 0.864 | 960 | 2.9 | 82.5 |
| 3% | do | 0.890 | 900 | 2.7 | 82.0 |
| 1% | Two part j | 0.900 | 800 | 2.4 | 79.5 |
| 2% | do | 0.860 | 1,000 | 3.1 | 86.5 |
| 3% | do | 0.781 | 1,030 | 3.1 | 84.0 | i Glyceryl lactostearate.
j Mixture of 50% "i" and 50% stearyl lactylic acid containing 0.9 lactyl groups per molecule.

EXAMPLE 11

Example 6 was again repeated using the compound sorbitan monostearate.

The pertinent data was as follows:

| Use Level (Based on Total Flour) | Emulsifier | Batter Specific Gravity | Cake Volume (cc.) | Cake Specific Volume | Cake—Total Quality Score |
|---|---|---|---|---|---|
| 0 | | 0.925 | 780 | 2.35 | 74.0 |
| 1% | One part k | 0.910 | 810 | 2.5 | 74.0 |
| 2% | do | 0.914 | 880 | 2.8 | 76.0 |
| 3% | do | 0.975 | 800 | 2.4 | 77.0 |
| 1% | Two part l | 0.900 | 760 | 2.3 | 80.5 |
| 2% | do | 0.884 | 1,020 | 3.1 | 84.0 |
| 3% | do | 0.858 | 980 | 2.9 | 82.0 | k Sorbitan monostearate.
l Mixture of 50% "k" and 50% stearyl lactylic acid containing 0.9 lactyl groups per molecule.

EXAMPLE 12

The compound polyoxyethylene (20) sorbitan monostearate was tested using the procedure detailed in Example 6.

The pertinent data was as follows:

| Use Level (Based on Total Flour) | Emulsifier | Batter Specific Gravity | Cake Volume (cc.) | Cake Specific Volume | Cake—Total Quality Score |
|---|---|---|---|---|---|
| 0 | | 0.925 | 780 | 2.35 | 74.0 |
| 1% | One part m | 0.947 | 780 | 2.3 | 63.5 |
| 1% | Two part n | 0.815 | 820 | 2.5 | 84.5 |
| 2% | do | 0.791 | 1,050 | 3.2 | 84.5 | m Polyoxyethylene (20) sorbitan monostearate.
n Mixture of 50% "m" and 50% stearyl lactylic acid containing 0.9 lactyl groups per molecule.

EXAMPLE 13

Example 6 was again repeated with a mixture of 90% sorbitan monostearate and 10% polyoxyethylene (20) sorbitan monostearate making up the base emulsifier.

The pertinent data was as follows:

| Use Level (Based on Total Flour) | Emulsifier | Batter Specific Gravity | Cake Volume (cc.) | Cake Specific Volume | Cake—Total Quality Score |
|---|---|---|---|---|---|
| 0 | | 0.925 | 780 | 2.35 | 74.0 |
| 1% | One part o | 0.906 | 850 | 2.6 | 78.0 |
| 2% | do | 0.925 | 890 | 2.7 | 77.5 |
| 3% | do | 0.955 | 930 | 2.8 | 78.0 |
| 1% | Two part p | 0.874 | 790 | 2.4 | 82.5 |
| 2% | do | 0.896 | 1,020 | 3.1 | 86.5 |
| 3% | do | 0.856 | 960 | 2.9 | 81.0 | o A mixture of 90% sorbitan monostearate and 10% polyoxyethylene (20) sorbitan monostearate.
p A mixture of 50% "o" and 50% stearyl lactylic acid containing 0.9 lactyl groups per molecule.

The results of the tests shown in Examples 6 through 13 clearly demonstrate that the cakes produced with shortening modified with the two part addition agents of Examples 1 through 5 have lower batter specific gravity, higher quality score and increased cake volume than do cakes produced with shortening not modified according to the present invention.

EXAMPLE 14

To demonstrate in part the action of the agents of this invention, a typical cream filling formulation was employed. The ingredients and procedure were as follows:

| Ingredients | Weight Percent | Weight (gms.) |
|---|---|---|
| Powdered sucrose | 42.75 | 128.25 |
| Shortening | 27.25 | 81.75 |
| Powdered milk | 6.75 | 20.25 |
| Salt | 0.40 | 1.20 |
| Flavor | 0.29 | 0.87 |
| Water | 22.56 | 67.68 |

The dry ingredients were creamed with half the water for ten minutes at speed number 8 using a Hamilton Beech Model G mixer. The bowl was scraped down, the remainder of the water was added, and mixing continued for six additional minutes. Specific gravity and volume were measured together with liquid separation after 140 hours. For comparative results, the following additives were substituted for part of the shortening in the above formula.

Variable #1—8 grams of mono- and diglyceride containing 40% mono- and 50% diglyceride.
Variable #2—4 grams of the same mono- diglyceride and 4 grams of a sodium salt of a stearyl lactylic acid preparation.

The results of this test are summarized in the following table.

| Variable | Specific Gravity | Volume (ml.) | Mls. Bleed 140 Hours at 72° F. |
|---|---|---|---|
| Control | 0.744 | 450 | 40 |
| #1 | 0.687 | 465 | 22 |
| #2 | 0.643 | 525 | 0 |

These data exhibit the advantage derived by these improved emulsification agents. Increased volume and improved stability of the produced food product are in evidence.

EXAMPLE 15

The effects of the new addition agents of the present invention may be demonstrated in part by use in a typical yellow cake formulation. An agent was formulated, including 35 parts palmityl lactylic acid which contained on the average 0.6 lactyl group per molecule, 30.5 parts distilled monoglyceride, 9 parts polyoxyethylene (20) sorbitan monostearate, and 20.5 hydrogenated vegetable oil. The homogeneous molten mixture was mixed with a small stirrer and rapidly chilled until the combination was a soft plastic not unlike typical cake shortening.

This preparation was compared with a product resultant from a similar preparation which did not include the palmityl lactylic acid. This agent is referred to as the base combination.

The following ingredients and procedure were employed in the test.

| Ingredients | Bakers Percent | Gms. |
|---|---|---|
| Cake flour | 100.0 | 354.7 |
| Granulated salt | 3.0 | 10.6 |
| Baking powder | 6.0 | 21.3 |
| Granulated sugar | 120.0 | 425.7 |
| Powdered milk | 12.5 | 44.3 |
| Dry vanilla concentrate | 0.4 | 1.4 |
| Shortening | 40.0 | 142.0 |
| Frozen whole eggs | 50.0 | 177.4 |
| Water | 110.0 | 390.0 |

The shortening and emulsifier were added to 858 gms. dry ingredients and mixed for four minutes at first speed using a Hobart C-100 mixer equipped with a three quart bowl and batter paddle.

*First stage*

Over a one minute period, 210 mls. of water was added while mixing on first speed, the bowl was scraped and then mixed at first speed for two minutes.

*Second stage*

All of the eggs were added over a one minute period at first speed, the bowl was scraped and mixing continued two and one-half minutes at second speed.

*Third stage*

Over a one minute period, 180 mls. of water was added while mixing at first speed, the bowl was scraped down and mixing continued three minutes at first speed.

The temperature of the water and eggs was controlled whereby the batter temperature was maintained between 70° F. and 73° F.

368 grams of batter was scaled into two 8 inch round cake pans and baked at 375° F. for twenty-five minutes. Cakes were allowed to cool forty-five minutes prior to measuring volume by rape seed displacement and cutting for quality comparison.

Quality score was again determined as detailed in Example 6.

The data recorded included the following information:

| Use Level (Based on Total Flour) | Batter Specific Gravity | Cake Volume (cc.) | Cake Specific Volume | Cake—Total Quality Score |
|---|---|---|---|---|
| 0.5% palmityl, 0.6 lactylic acid+base combination | 0.821 | 1,000 | 3.1 | 90.0 |
| 0.5% base combination | 0.925 | 910 | 2.9 | 81.5 |

As the above data indicates, the inclusion of palmityl lactylic acid induced a substantial improvement in the yellow layer cake.

EXAMPLE 16

Example 6 was repeated using the agents prepared as detailed in Example 15.

The following data was recorded.

| Use Level (Based on Total Flour) | Batter Specific Gravity | Cake Volume (cc) | Cake Specific Volume | Cake—Total Quality Score |
|---|---|---|---|---|
| 2% palmityl 0.6 lactylic acid+base combination | 0.866 | 980 | 2.9 | 93.5 |
| 2% base combination | 0.935 | 820 | 2.5 | 83.0 |

The results were similar to those found in Example 15.

EXAMPLE 17

Similar comparisons were made using a whip batter formulation which did not contain shortening.

YELLOW BATTER WHIP CAKE

Using a C-100 Hobart mixer equipped with a three quart bowl and wire whip.

| Ingredients | Bakers Percent | Gms. Weighed |
|---|---|---|
| Flour | 100.0 | 364.0 |
| Granulated sugar | 110.0 | 400.0 |
| Baking powder | 6.0 | 21.8 |
| Salt | 3.0 | 10.9 |
| Powdered milk | 10.0 | 36.4 |
| Corn syrup | 4.0 | 14.6 |
| Egg whites | 13.0 | 47.3 |
| Whole eggs | 30.0 | 109.2 |
| Emulsifier | 3.0 | 11.5 |
| Water | 101.2 | 368.4 |
| Vanilla (dry) | 0.4 | 1.5 |

The dry ingredients, eggs, emulsifier and 218 ml. of water were placed in the bowl and mixed for one minute on first speed. The bowl was then scraped and the batter mixed for five minutes on third speed. The bowl was again scraped down and 150 ml. of water added over a one minute period while mixing on first speed. The bowl was scraped and mixing continued four minutes longer.

368 gms. of batter at a temperature of 72° F. were placed in 8 inch round, greased cake pans and baked for twenty-five minutes at 375° F.

WHITE BATTER WHIP CAKE

Using a C-100 Hobart mixer equipped with a three quart bowl and a wire whip.

| Ingredients | Bakers Percent | Gms. Weighed |
|---|---|---|
| Flour | 100.0 | 364.0 |
| Granulated sugar | 110.0 | 400.0 |
| Baking powder | 6.0 | 21.8 |
| Salt | 3.0 | 10.9 |
| Powdered milk | 10.0 | 36.4 |
| Corn syrup | 4.0 | 14.6 |
| Egg whites | 35.0 | 127.4 |
| Whole eggs | 8.0 | 29.1 |
| Emulsifier | 3.0 | 11.5 |
| Water | 60.0 | 218.4 |
| Vanilla (dry) | 0.4 | 1.5 |
| Mycoban (mold inhibiter) | 0.4 | 1.5 |
| Water | 41.2 | 150.0 |

The dry ingredients, eggs, emulsifier and 218.4 cc. of water were placed in the bowl and mixed for two minutes on first speed. The bowl was scraped down and mixing continued for nine minutes on third speed.

The bowl was again scraped and 150 cc. of water was added over a one minute period on first speed, the bowl was scraped down again. The batter was mixed three minutes additional on first speed. 368.4 grams were baked in 8 inch pans at 375° F. for twenty-four minutes. The batter temperature was 72° F.

Data compiled are included in the tables. In the tables, the base combination is that of Example 15.

YELLOW BATTER WHIP CAKE

| Use Level (Based on Total Flour) | Batter Specific Gravity | Cake Volume (cc.) | Cake Specific Volume | Cake—Total Quality Score |
|---|---|---|---|---|
| 3% arachidyl-2 lactylic acid +base combination | 0.785 | 1,030 | 3.2 | 91.5 |
| 3% base combination | 0.853 | 920 | 2.9 | 80.5 |

WHITE BATTER WHIP CAKE

| Use Level (Based on Total Flour) | Batter Specific Gravity | Cake Volume (cc.) | Cake Specific Volume | Cake—Total Quality Score |
|---|---|---|---|---|
| 3% stearyl-0.8 lactylic acid +base combination | 0.816 | 1,010 | 3.0 | 90.0 |
| 3% base combination | 0.980 | 875 | 2.5 | 78.0 |

These results again clearly exhibit the desirable improvement afforded by the new emulsifier agents of the present invention.

EXAMPLE 18

Bread was prepared using the following formula and procedure:

| Ingredients | Percent | Weight (gms.) |
|---|---|---|
| Flour (on 14% H$_2$O Basis) | 100.0 | 800.0 |
| Salt | 2.25 | 18.0 |
| Granulated sugar | 4.0 | 32.0 |
| Cerelose | 5.0 | 40.0 |
| Shortening | 3.0 | 24.0 |
| Nonfat dry milk | 3.5 | 28.0 |
| Improved Paniplus | 0.3 | 2.4 |
| Yeast | 2.0 | 16.0 |
| Arkady yeast food | 0.5 | 4.0 |
| Water | 65 | 520.0 |

A sixty-five percent sponge was used on the basis of 800 grams of flour for each dough. An absorption of sixty-four percent of the weight of flour was added for sponging. The yeast was emulsified in part of the sponge water prior to the addition to the flour. The total yeast food was added to the sponge.

The sponge was mixed one-half minute at low speed in a Hobart A–120 mixer, then four minutes in second speed. The sponge was placed in a metal trough and fermented at 80° F. for four and one-half hours.

Dough was mixed as follows: the fermented sponge, the balance of the dry ingredients and the remaining water were placed in the mixing bowl. Mixing was initiated at low speed for one-half minute and then second speed for seven and one-half minutes. The dough temperature was regulated to 80° F.

Immediately after mixing, the dough was placed in the fermentation cabinet for forty minutes. At the end of that period, the dough was removed and two 542 gram pieces scaled. Each was processed through a dough sheeter and allowed to stand at room temperature for ten minutes.

Each piece was then moulded in a conventional commercial moulder, placed in a pan and proofed at 110° F. dry bulb and 105° F. wet bulb until the surface of the dough was ¾ inch above the top of the pan.

The doughs were then baked at 415° F. for twenty-five minutes.

Following baking, the loaves were removed from the oven, placed on a rack and cooled for seventy minutes and finally placed in polyethylene bags for twelve hours prior to scoring.

Following scoring, the compressibility of two inch sections of the bread crumb was measured using a Labline compressometer equipped with a three centimeter diameter cylinder (260 gms.) and graduated in tenths of a millimeter. The penetrations of a fresh cut section in ten seconds was measured and recorded. This procedure was repeated with four duplicate samples to provide an average value. Sample loaves were stored at 78° F. in air tight containers, compressibility measured after three and five days storage.

The following results were obtained:

| | Additive | Quality Score | Loaf Compressibility 0.1 mm. | | |
|---|---|---|---|---|---|
| | | | 1st Day | 3rd Day | 5th Day |
| 1 | Control | 86 | 195 | 138 | 56 |
| 2 | 0.5% mono-diglyceride | 84 | 191 | 127 | 47 |
| 3 | 0.25% sodium stearyl (0.75) lactylate + 0.25% mono-diglyceride | 87 | 207 | 163 | 68 |

As can be seen from the data, the addition of the agent of the present invention resulted in improvement in apparent staling and quality.

EXAMPLE 19

The utility of the agents of this invention may be demonstrated in part by their effect on water-oil emulsions. A combination of ingredients designed to produce a flowable butter for easy application on brown n' serve rolls constitutes a system of this type. The stability of a flowable butter formulation of the following composition was investigated.

| | Gms. |
|---|---|
| Butter (81% fat) | 50.0 |
| Distilled water | 75.0 |
| Dry skim milk | 2.5 |

Emulsifiers were included in this system by direct addition to the butter. The level of emulsifier was maintained constant at 1% of the butter fat weight. Ingredients were weighed together in a 400 ml. Erlenmeyer flask and the temperature of each mixture elevated with stirring to 180° F. using a hot water bath. The mixture was then cooled to 160° F. and immediately passed through a Fisher laboratory homogenizer with agitation to insure uniform distribution of butter fat. A 100 ml. portion of the resultant product was transferred to a graduated cylinder and allowed to cool and stand at 75° F. Periodic observations of the amount of separation of each test sample were recorded. The additives used in this series were as follows:

(1) Control (no additive).
(2) Palmityl lactylic acid (containing an average of 0.8 lactyl group per molecule).
(3) Mono- and diglyceride preparation containing 40% monoglyceride and 50% diglyceride.
(4) Nine parts mono-diglycerides and one part palmityl lactylic acid (containing an average of 0.8 lactyl group per molecule).
(5) Nine parts sorbitan monostearate and one part polyoxyethylene (20) sorbitan monostearate.
(6) Nine parts sorbitan monostearate and one part palmityl lactylic acid (containing an average of 0.8 lactyl group per molecule).

The following table is a record of the findings of this experimentation.

PERCENT SEPARATION

| Test No. | 2 hrs. | 3 hrs. | 4 hrs. | 24 hrs. | 43 hrs. |
|---|---|---|---|---|---|
| 1 | 3 | 5 | 6 | 18 | 21 |
| 2 | 0 | 1 | 2 | 5 | 7 |
| 3 | 0 | 2 | 2.5 | 8 | 11 |
| 4 | 0 | 0.5 | 0.5 | 3.5 | 6 |
| 5 | 1 | 1.5 | 1.5 | 5 | 10 |
| 6 | 0 | 0.5 | 0.5 | 3.0 | 6.5 |

The stability of the emulsion was markedly improved when the agents of the invention (Nos. 4 and 6) described herein were employed.

EXAMPLE 20

Foam-mat drying is a relatively new process for the dehydration of foodstuffs. The method involves the making of a stiff foam by whipping air or an inert gas into a pure or preconcentrated foodstuff in the presence of a foam forming stabilizer or emulsifier. The foam is then extruded, supported on perforated plates, trays or belts for rapid drying with forced hot air. Products of excellent quality and reconstitutability result.

To demonstrate in part the action the agents of this invention, the foam volume and stability of treated orange juice was investigated. To facilitate treatment, aqueous emulsifier dispersions were prepared with the following emulsifiers:

(1) 100% mono- and diglyceride preparation containing 40% monoglyceride and 50% diglyceride.
(2) 90% mono- and diglyceride and 10% palmityl lactylic acid (containing an average of 0.8 lactyl group per molecule).

(3) 100% palmityl lactylic acid (containing an average of 0.8 lactyl group per molecule).
(4) 90% mono- and diglyceride, and 10% polyoxyethylene (20) sorbitan monostearate.
(5) 90% sorbitan monostearate and 10% palmityl lactylic acid (containing an average of 0.8 lactyl group per molecule).

In these tests, 100 ml. of fresh reconstituted pure orange juice at 95° F. was introduced together with 5 gms. of the emulsifier dispersion into a one quart bowl and mixed two minutes at maximum speed with a Hamilton Beach Model G mixer. The temperature and volume of the resultant foam was then measured and the entire body transferred for determination of liquid separation following storage at 75° F.

The results of this test are summarized in the following table.

| Variable | Foam Temp. (° F.) | Foam Volume (mls.) | Mls. Bleed | | |
|---|---|---|---|---|---|
| | | | 15 min. | 30 min. | 60 min. |
| 1 | 76 | 375 | 48 | 53 | 65 |
| 2 | 78 | 445 | 0.5 | 6 | 18 |
| 3 | 77 | 175 | 45 | 54 | 65 |
| 4 | 78 | 400 | 29 | 40 | 50 |
| 5 | 78 | 520 | 6 | 19 | 30 |

These data clearly exhibit the advantage of the emulsification agents of the present invention. Increased volume and improved stability of the foams are in evidence when these agents (Nos. 2 and 5) are employed.

EXAMPLE 21

To further demonstrate the unexpected action of the agents of this invention, their effect on the retrogradation and the jelling characteristics of common corn starch was examined. The emulsification agents, listed below, were employed in an aqueous dispersion containing one part emulsifier and five parts water.

Code: Additive
(1) _____ Control.
(2) _____ Mono- and diglyceride (40% monoglyceride content).
(3) _____ Nine parts mono- and diglyceride and one part palymityl lactylic acid (containing an average of 0.8 lactyl group per molecule).
(4) _____ Palmityl lactylic acid (containing an average of 0.8 lactyl group per molecule).

Into a 250 ml. beaker was introduced 99 mls. of water, 10 gms. of corn starch and 1 gm. of each of the above aqueous dispersions containing 16.67% emulsifier. The emulsifier content of each of the mixtures was 0.15% of the total preparation.

The beakers were placed in a boiling water bath and, with continuous stirring, were warmed for twenty minutes. After ten minutes of heating, the products observed were as follows:

(1) Very viscous, white paste.
(2) Moderately viscous, white paste.
(3) Very thin slurry, no significant change from original appearance.
(4) Moderately viscous, white paste.

Following the twenty minute cooling period, all of the mixtures were homogeneous, semi-transparent, viscous pastes. No gross difference in viscosity could be detected. Each of the beakers were covered with a watch glass and the pastes were allowed to cool to 75° F. without further agitation. After ninety minutes' standing, the physical character of each paste was examined.

(1) Paste set to rigid gel, typical expected reaction.
(2) Weak gel, much softer than control.
(3) Gel formation absent, semi-transparent viscous paste, no apparent change in character from that following twenty minute heat treatment.
(4) Moderately firm gel.

The mixtures were observed periodically for six days. Significant changes in viscosity were complete in 24 hours and the findings as reported above were unchanged relatively, the differences noted were simply more pronounced.

It was quite apparent that the rate and degree of starch retrogradation was reduced most effectively by the incorporation of the agent of this invention (No. 3). In addition, the agent exhibits a pronounced effect in retarding the rate of starch granule swelling in aqueous dispersion.

EXAMPLE 22

The beneficial and unexpected effects of the new addition agents of the present invention may further be demonstrated by their addition to ice cream, ice milk, artificial ice cream or Mellorine, sherbets and a variety of frozen desserts. These agents allow frozen milk products to come from the freezer in a stiffer, drier state at a higher temperature, thus enhancing flavor. They help to evenly distribute fat and moisture. They increase the whipability of ice cream and related products giving a smoother texture with improved overrun.

The agents function by simply dissolving them in the fat phase of the system or by introducing them in aqueous dispersion. It is theorized that the agents enhance the emulsification and homogenization of the products by aiding in the division of the minute fat particles thus supplementing the action of the stabilizer which functions in the water phase.

These agents have been found effective at levels from 0.05% to 1.0%.

The following formulae typify recipes in which the emulsification agents have been found useful.

| | Gms. |
|---|---|
| Ice cream: | |
| Whole milk | 1016.0 |
| Stabilizer | 6.4 |
| Dry skim milk | 76.7 |
| Sugar | 236.0 |
| Cream | 307.0 |
| Ice milk: | |
| Cream | 240.0 |
| Sugar | 240.0 |
| Stabilizer | 6.4 |
| Dry skim milk | 144.0 |
| Skim milk | 970.0 |

Using the above formulae, it can be demonstrated that the agents are functional in a variety of mixes and over a wide range of fat content.

The stability of the agents permit their incorporation into the product prior to pasteurization and homogenization.

It is apparent from experimentation that the novel agents of the invention function to raise drawing temperature, increase stiffness and dryness, improve smoothness and texture and increase overrun.

The invention in its broader aspects is not limited to the specific compositions, steps and methods described, but departures may be made therefrom within the scope of the accompanying claims without departing from the principles of the invention and without sacrificing its chief advantages.

What is claimed:
1. The shortening composition which comprises a triglyceride based fatty shortening material, and at least 0.1% by weight of an addition agent which comprises, in combination: (1) an acyl lactylic acid compound corresponding to the general formula

wherein RCO is a member selected from the group consisting of acyl radicals of fatty acids, $n$ is a number ranging from greater than zero but less than 1 which represents the average number of lactyl groups per molecule, and Z is a cation; and (2) a member selected from the group consisting of mono-fatty acid esters of aliphatic polyhydric alcohol compounds, di-fatty esters of aliphatic polyhydric alcohol compounds, and mixtures of mono- and di-fatty acid esters of aliphatic polyhydric alcohol compounds; the weight ratio of composition (1) to composition (2) being between about 0.01 and 100.

2. A shortening composition which comprises a triglyceride based fatty shortening material, and at least 0.1% by weight of the addition agent which comprises, in combination: 10 to 90 weight percent of composition comprising an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 90 to 10 weight percent of mono-fatty acid esters of glycerol.

3. The shortening composition of claim 2 wherein the composition comprising the mono-fatty acid esters of glycerol includes di-fatty acid esters of glycerol.

4. A shortening composition which comprises a triglyceride based fatty shortening material and at least 0.1% by weight of an addition agent which comprises, in combination: 1 to 99 weight percent of a composition comprising an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 99 to 1 weight percent of a composition comprising 5 to 20 weight percent polyoxyethylene sorbitan monostearate and 80 to 95 weight percent sorbitan monostearate.

5. A shortening composition which comprises a triglyceride based fatty shortening material and at least 0.1% by weight of an addition agent which comprises, in combination: 1 to 99 weight percent of a composition comprising: an acyl lactylic acid compound corresponding to the general formula $$RCO(OCHCH_3CO)_nOZ$$

wherein RCO is a member selected from the group consisting of acyl radicals of fatty acids containing 16 to 24 carbon atoms, and mixtures thereof, $n$ is a number ranging from greater than zero but less than 1 which represents the average number of lactyl groups per molecule and Z is a cation; and 99 to 1 weight percent of a composition comprising polyoxyethylene sorbitan monostearate.

6. A shortening composition which comprises a triglyceride based fatty shortening material, and at least 0.1% by weight of an addition agent which comprises, in combination: 1 to 99 weight percent of a composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 99 to 1 weight percent of a composition comprising sorbitan monostearate.

7. A shortening composition which comprises a triglyceride based fatty shortening material, and at least 0.1% by weight of an addition agent which comprises, in combination: 10 to 90 weight percent of a composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 90 to 10 weight percent of a composition comprising propylene glycol monostearate.

8. A shortening composition which comprises a triglyceride based fatty shortening material, and at least 0.1% by weight of an addition agent, which comprises, in combination, 10 to 90 weight percent of a composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average of lactyl groups per molecule and Z is a cation; and 90 to 10 weight percent of a composition comprising glyceryl lactopalmitate.

9. A shortening composition which comprises a triglyceride based fatty shortening material, and at least 0.1% by weight of an addition agent which comprises, in combination, 10 to 90 weight percent of a composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 90 to 10 weight percent of a composition comprising glyceryl lactostearate.

10. A cake mix comprising flour, baking powder and sugar intimately blended with a shortening composition which comprises triglyceride based fatty shortening material and at least 0.1% by weight of the shortening of an addition agent which comprises: (1) an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and (2) a member selected from the group consisting of mono-fatty acid esters of aliphatic polyhydric alcohol compounds, di-fatty esters of aliphatic polyhydric alcohol compounds, and mixtures of mono- and di-fatty acid esters of aliphatic polyhydric alcohol compounds; the weight ratio of composition (1) to composition (2) being between about 0.01 and 100.

11. A cake mix comprising flour, baking powder and sugar intimately blended with a shortening composition which comprises a triglyceride based fatty shortening material and at least 0.1% by weight of the shortening of the addition agent which comprises, in combination: 1 to 99 weight percent of a composition comprising an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 99 to 1 weight percent of a composition comprising 5 to 20 weight percent polyoxyethylene sorbitan monostearate and 80 to 95 weight percent sorbitan monostearate.

12. A cake mix comprising flour, baking powder and sugar intimately blended with a shortening composition which comprises a triglyceride based fatty shortening material and at least 0.1% by weight of the shortening of the addition agent which comprises, in combination: 1 to 99 weight percent of a composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 99 to 1 weight percent of a composition comprising polyoxyethylene sorbitan monostearate.

13. A cake mix comprising flour, baking powder and sugar intimately blended with a shortening composition which comprises a triglyceride based fatty shortening material and at least 0.1% by weight of the shortening of the addition agent which comprises, in combination: 1 to 99 weight percent of a composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 99 to 1 weight percent of a composition comprising sorbitan monostearate.

14. A cake mix comprising flour, baking powder and sugar intimately blended with a shortening composition which comprises a triglyceride based fatty shortening material and at least 0.1% by weight of the shortening of the addition agent which comprises, in combination: 10 to 90 weight percent composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 90 to 10 weight percent of a composition comprising propylene glycol monostearate.

15. A cake mix comprising flour, baking powder and sugar intimately blended with a shortening composition which comprises a triglyceride based fatty shortening material and at least 0.1% by weight of the shortening of the addition agent, which comprises, in combination, 10 to 90 weight percent of a composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average of lactyl groups per molecule and Z is a cation; and 90 to 10 weight percent of a composition comprising glyceryl lactopalmitate.

16. A cake mix comprising flour, baking powder and sugar intimately blended with a shortening composition which comprises a triglyceride based fatty shortening material and at least 0.1% by weight of the shortening of the addition agent, which comprises, in combination, 10 to 90 weight percent of a composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 90 to 10 weight percent of a composition comprising glyceryl lactostearate.

17. A cake mix comprising flour, baking powder and sugar intimately admixed with at least 0.01% of an addition agent which comprises, in combination: (1) a composition comprising an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation selected from the group consisting of hydrogen, alkali and alkaline earth metal ions, aluminum and ammonium; and (2) a member selected from the group consisting of mono-fatty acid esters, di-fatty esters, and mixtures of mono- and di-fatty acid esters of aliphatic polyhydric alcohol compounds; the weight ratio of composition (1) to composition (2) being between about 0.01 and 100.

18. A cake mix comprising flour, baking powder and sugar intimately admixed with at least 0.01% of an addition agent which comprises, in combination: 10 to 90 weight percent of a composition comprising an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 90 to 10 weight percent of a composition comprising mono-fatty acid esters of glycerol.

19. The cake mix of claim 18, wherein the composition comprising mono-fatty acid esters of glycerol includes di-fatty acid esters of glycerol.

20. A cake mix comprising flour, baking powder and sugar intimately admixed with at least 0.01% of the addition agent which comprises, in combination: 1 to 99 weight percent of a composition comprising an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 99 to 1 weight percent of a composition comprising 5 to 20 weight percent polyoxyethylene sorbitan monostearate and 80 to 95 weight percent sorbitan monostearate.

21. A cake mix comprising flour, baking powder and sugar intimately admixed with at least 0.01% of the addition agent which comprises, in combination: 1 to 99 weight percent of a composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 99 to 1 weight percent of a composition comprising polyoxyethylene sorbitan monostearate.

22. A cake mix comprising flour, baking powder and sugar intimately admixed with at least 0.01% of the addition agent which comprises, in combination: 1 to 99 weight percent of a composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 99 to 1 weight percent of a composition comprising sorbitan monostearate.

23. A cake mix comprising flour, baking powder and sugar intimately admixed with at least 0.01% of the addition agent which comprises, in combination: 10 to 90 weight percent of a composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 90 to 10 weight percent of a composition comprising propylene glycol monostearate.

24. A cake mix comprising flour, baking powder and sugar intimately admixed with at least 0.01% of the addition which comprises, in combination: 10 to 90 weight percent of a composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average of lactyl groups per molecule and Z is a cation; and 90 to 10 weight percent of a composition comprising glyceryl lactopalmitate.

25. A cake mix comprising flour, baking powder and sugar intimately admixed with at least 0.01% of the addition agent which comprises, in combination, 10 to 90 weight percent of a composition comprising: an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule and Z is a cation; and 90 to 10 weight percent of a composition comprising glyceryl lactostearate.

26. A food member selected from the group consisting of bakery products, dairy products, foam mat dried products and starch products, said member containing an addition agent which comprises, in combination: (1) a composition comprising an acyl lactylic acid compound corresponding to the general formula $$RCO(OCHCH_3CO)_nOZ$$

wherein RCO is a member selected from the group consisting of acyl radicals of fatty acids, $n$ is a number ranging from greater than zero but less than 1 which represents the average number of lactyl groups per molecule, and Z is a cation; and (2) a member selected from the group consisting of mono-fatty acid esters, di-fatty esters, and mixtures of mono- and di-fatty acid esters of aliphatic polyhydric alcohol compounds; the weight ratio of composition (1) to composition (2) being between about 0.01 and 100.

27. The shortening composition of claim 1 wherein the RCO group of the acyl lactylic acid compound is a member selected from the group consisting of fatty acyl radicals containing 16 to 24 carbon atoms, including mixtures thereof.

28. The food member of claim 26 wherein said addition agent includes water as a component.

29. The shortening composition of claim 1 wherein $n$ in said formula, on the average, is between 0.3 and 0.9.

30. The cake mix of claim 10 wherein $n$ in said formula, on the average, is between 0.3 and 0.9.

References Cited by the Examiner

UNITED STATES PATENTS

| | | | |
|---|---|---|---|
| 2,611,704 | 9/1952 | Jaeger | 99—94 |
| 2,746,868 | 5/1956 | Cross et al. | 99—123 |
| 2,789,992 | 4/1957 | Thompson et al. | 260—410.9 |
| 2,973,270 | 2/1961 | Thompson et al. | 99—123 |
| 2,978,329 | 4/1961 | Cochran et al. | 99—118 |
| 3,071,472 | 1/1963 | Hager et al. | 99—94 |
| 3,117,010 | 1/1964 | Geisler | 99—118 |
| 3,144,341 | 8/1964 | Thompson | 99—123 |

FOREIGN PATENTS

| | | |
|---|---|---|
| 561,704 | 8/1958 | Canada. |

A. LOUIS MONACELL, *Primary Examiner.*